United States Patent [19]

Totino

[11] 3,921,565
[45] Nov. 25, 1975

[54] TELEPHONE ANSWERING MACHINE MESSAGE RECEIVED AND FOOTAGE INDICATOR

[75] Inventor: Peter J. Totino, West New York, N.J.

[73] Assignee: Quasar Microsystems, Inc., Brentwood, N.Y.

[22] Filed: Mar. 1, 1974

[21] Appl. No.: 447,322

[52] U.S. Cl. .............. 116/114 J; 33/172 F; 242/57
[51] Int. Cl.² .......................................... G01D 13/22
[58] Field of Search......... 242/57; 116/67 A, 114 R, 116/114 J; 33/172 F; 352/170–172; 360/137

[56] References Cited
UNITED STATES PATENTS

| | | | |
|---|---|---|---|
| 1,272,671 | 7/1918 | Jonson | 116/67 A |
| 2,624,306 | 1/1953 | Hatke | 116/67 A X |
| 3,036,629 | 5/1962 | Nicholas | 242/57 X |
| 3,335,695 | 8/1967 | Hayashi | 352/172 X |
| 3,606,199 | 9/1971 | Fujimoto | 242/57 X |

Primary Examiner—John W. Huckert
Assistant Examiner—John M. Jillions
Attorney, Agent, or Firm—Friedman & Goodman

[57] ABSTRACT

In a telephone answering machine, the present invention is for a message received and footage indicator which includes a take-up reel which has a central cylindrical portion about which the tape is wound and which is provided with a circumferential slit disposed in a plane substantially normal to the axis about which the take-up reel rotates. A feeler is provided mounted proximate to the take-up reel and mounted for pivotal movement in the plane of the slit. An indicator assembly is coupled to the feeler. A helical spring having one fixed end and the other end engaged with the indicator assembly is arranged to move the indicator assembly, including the feeler, to a first position when the slit is exposed and the feeler enters the same. The indicator assembly moves to a discreet second position against the action of the helical spring when the slit is covered by at least one layer of tape and the feeler is prevented from entering into the slit. The second position signifies that at least one message has been received and the take-up reel has moved from a totally unwound condition to at least a partially wound condition. The indicator assembly gradually and continuously moves in a direction beyond the second position against the action of the helical spring when additional tape is wound on the take-up reel and the feeler is displaced by the increased accumulation of tape about the central cylindrical portion. The position to which the indicator moves beyond the second position provides an indication of the extent to which recorded tape has been wound onto the take-up reel.

12 Claims, 9 Drawing Figures

TELEPHONE ANSWERING MACHINE MESSAGE RECEIVED AND FOOTAGE INDICATOR

BACKGROUND OF THE INVENTION

In the use of telephone answering machines, it is desirable that indications be provided, first, as to whether any messages have been received and, second, the number of messages received or the amount of tape which has been recorded during the reception of messages. In this connection, there are known in the prior art message received indicators. For example, numerous prior art answering machines incorporate a light or other visible indication when at least one message has been received. In this manner, it becomes readily apparent whether any messages have been received and these may then be played at one's convenience.

However, these message received indicators do not provide any information as to the extent of the number of messages which have been received. For this purpose, some known answering machines have utilized a separate footage counter. While resetable counters, for example, do provide an indication of the footage of tape which has been recorded, a counter of this type is an expensive component which has not heretofore been available for less costly telephone answering machine models.

Some telephone answering machines incorporate both a message received indicator and a footage indicator. Clearly, the provision of two such independent indicators represents an additional expense both in the manufacture and maintenance of the answering machine.

There is not known in the prior art a simple device or arrangement which serves both as a message received and footage indicator. The present invention discloses such a device which is both extremely simple in construction and economical to manufacture. The device of the present invention provides an instant indication of a condition wherein at least some tape has been wound onto the take-up reel to indicate the reception of at least one message. Subsequently, the device of the present invention continuously monitors the accumulation of tape on the take-up reel, this being translated into a footage indication, which is a measure of the number of messages which have been received and recorded.

While some prior art machines permit visual observation of the reels for the purpose of ascertaining the extent to which tape has been transferred from the supply reel to a take-up reel, this is frequently not a convenient method of ascertaining the extent of the number of messages which have been received since the observation must frequently be made close up to the machine, generally through a small plastic window which is disposed proximate to one of the reels. On the other hand, the present invention provides, with a simple arrangement, a device which provides the requisite information from a reasonable distance from the machine.

SUMMARY OF THE INVENTION

Accordingly, it is an object of the present invention to provide a message received and footage indicator which is not possessed of the above described disadvantages associated with prior art answering machines.

It is another object of the present invention to provide an indicator of the above type which is simple in construction and economical to manufacture.

It is still another object of the present invention to provide an indicator of the type under discussion which provides information both as to whether a message has been received and footage, the latter providing an approximate indication as to the number of messages which have been received.

It is yet another object of the present invention to provide a message received and footage indicator which cooperates with a slotted central cylindrical portion of a reel about which tape is wound and which causes a pointer to move with displacement of a feeler abutting against the central cylindrical portion or tape wound thereabout with increased accumulation of tape about the central cylindrical portion.

It is a further object of the present invention to provide a message received and footage indicator which is self resetting and which returns to its initial position when tape is rewound from the take-up reel to the supply reel.

It is still a further object of the present invention to provide a device of the type under discussion which incorporates a scale to provide an accurate indication of the extent of footage which has been recorded and wound onto a take-up reel of a telephone answering machine, this permitting repetitive and selective playback of a message or messages by rewinding the reels to a predetermined footage indication.

In order to achieve the above objects, as well as other objects which will become apparent hereafter, a message received and footage indicator for use in a telephone answering machine in accordance with the present invention comprises a take-up reel for receiving and accumulating tape with recorded messages thereon. Said take-up reel has a central cylindrical portion about which the tape is wound which is provided with a circumferential slit disposed in a plane substantially normal to the axis about which said take-up reel rotates. Feeler means are provided mounted proximate to said take-up reel and mounted for pivotal movement in the plane of said slit. Indicator means is provided which is coupled to said feeler means. Biasing means is provided for moving said indicator means towards a first position when said slit is exposed and said feeler means enters the same. Said indicator means moves to a discreet second position against the action of said biassing means when said slit is covered by at least one layer of tape and said feeler means is prevented from entering said slit. Said second position signifies that at least one message has been received and said take-up reel has moved from a totally unwound condition to at least a partially wound condition. Said indicator means gradually and continuously moves in a direction beyond said second position against the action of said biassing means when additional tape is wound on said take-up reel and said feeler means is displaced by the increased accumulation of tape about said central cylindrical portion. The position to which said indicator means moves beyond said second position provides an indication of the extent to which recorded tape has been wound onto said take-up reel.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 also shows, in dashed outline, a position of the feeler assumable by the latter with continued rewinding of the tape subsequent to the movement of the pointer to the position shown in solid outline;

DESCRIPTION OF THE PREFERRED EMBODIMENTS

Figure 1:
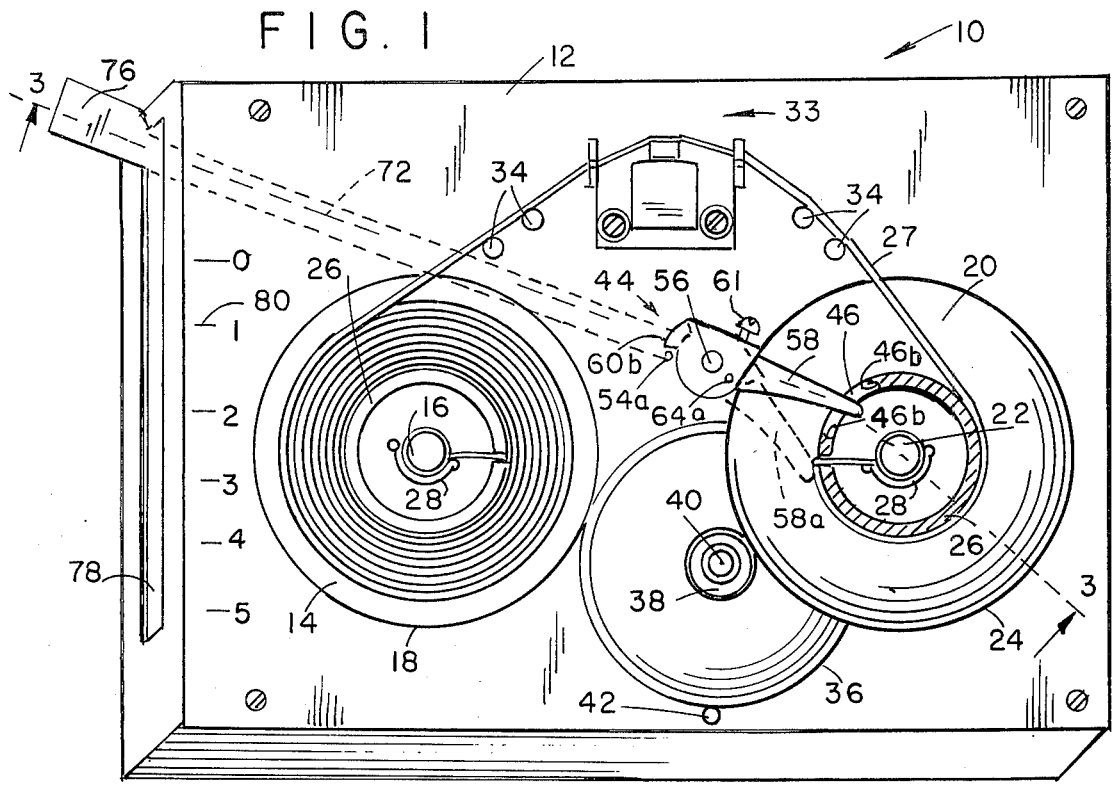
FIG. 1 is a top view of a tape deck of a telephone answering machine, showing a rim-type drive and the message received and footage indicator in accordance with the present invention. The pointer in FIG. 1 is shown in the completely unwound condition of the take-up reel prior to the reception of a recorded message.
Figure 2:
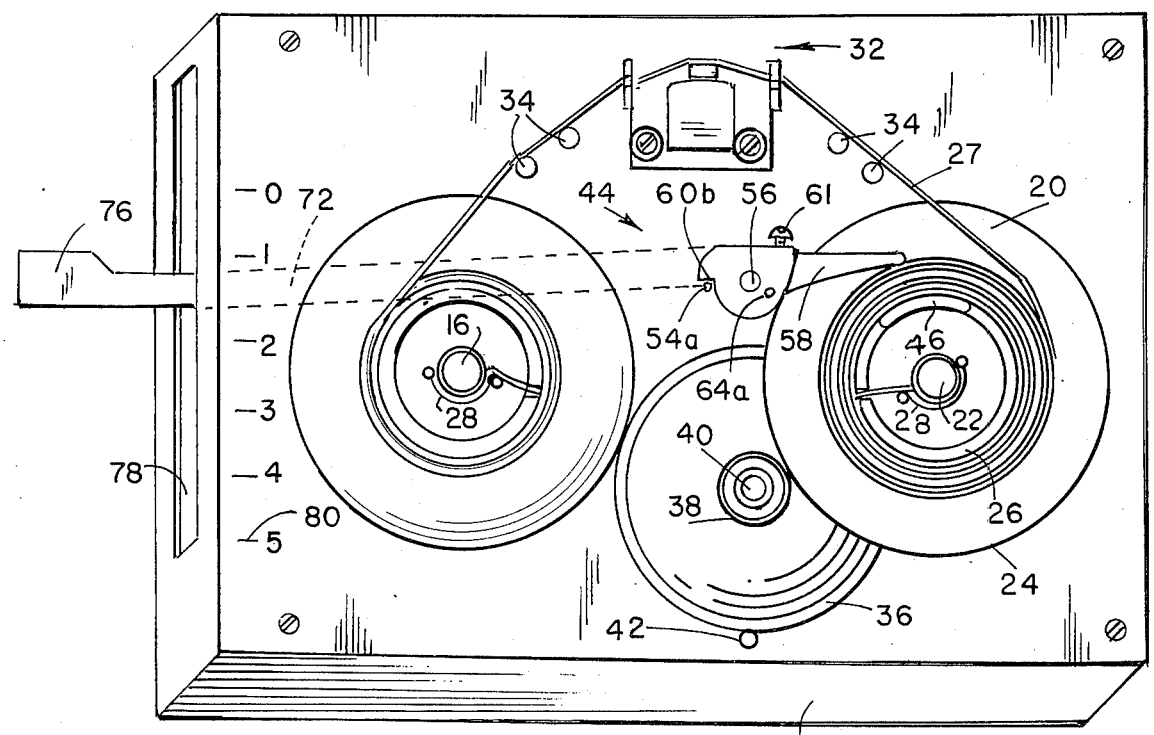
FIG. 2 is similar to FIG. 1, but showing a quantity of recorded tape accumulated on the take-up reel and the corresponding movement of the feeler and the pointer to indicate that a series of messages have been received.

Referring now to the FIGURES, in which identical or similar parts are designated by the same reference numerals throughout, and first referring to FIGS. 1 and 2, a tape deck 10 of an answering machine is shown. Only the tape drive for the incoming recorded message is illustrated. The announcement mechanism as well as the electronics for coordinating these various devices is not shown.

The message received and footage indicator in accordance with the present invention will be described as being incorporated in a rim-driven reel to reel recording device. However, as will become clear from the description that follows, the invention to be described can be utilized with any type of drive and is not limited to rim drives. The message received and footage indicator to be described can be utilized with any tape recording apparatus which includes a take-up reel which is initially in a totally unwound condition and changes to a condition where at least some tape is accumulated on the take-up reel.

The tape deck 10 of the answering machine has a deck wall 12 on which the various moving parts to be described are mounted. Mounted on the wall 12 is a supply reel 14 which is mounted for rotation on a shaft 16. The supply reel 14 is provided with a rim 18.

Spaced from the supply reel 14 is a take-up reel 20, similar in construction to the supply reel and mounted for rotation on a shaft 22. The take-up reel has a rim 24.

Each of the reels has a central cylindrical portion 26 which is suitable for receiving and accumulating tape thereon in a conventional manner.

The ends of the tape 27 can be fixed to the shafts of the respective reels by means of spring clips 28 or any other conventional means. A suitable gap is provided in each central cylindrical portion for passing the ends of the tape from the exteriors to the interiors of the central cylindrical portions.

Figure 3:
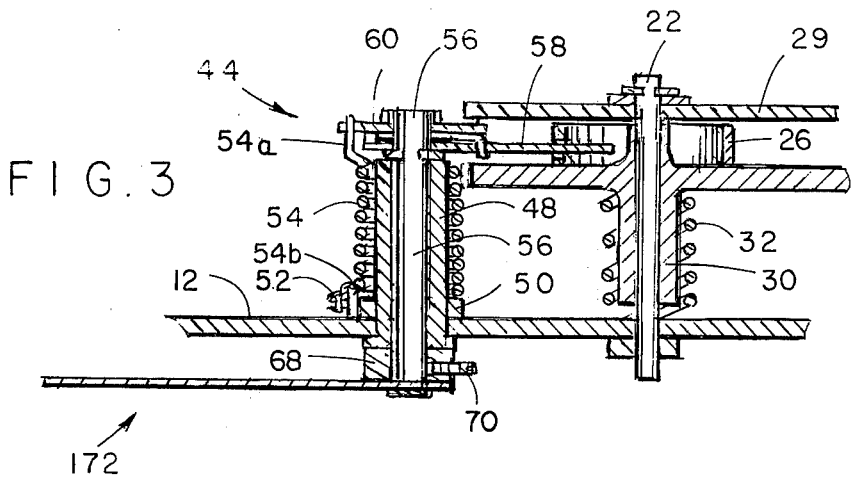
FIG. 3 is a partial cross section of the tape deck and the message received and footage indicator shown in FIG. 1, taken along line 3—3.

Referring to FIG. 3, it will be noted that the take-up reel 20 is advantageously provided with a hub 30 through which the shaft 22 extends. A helical spring is provided coaxially with the hub 30 for urging the take-up reel 20 in a direction away from the deck or chassis wall 12. This arrangement is desirable to provide some axial play for the take-up reel as well as for minimizing frictional forces which may otherwise be encountered between the take-up reel and the wall 12. Any suitable conventional means may be utilized for preventing the take-up reel 20 from moving beyond the upper end of the shaft 22. A magnetic head assembly 33 is disposed approximately midway between the reels 14, 20 and slightly rearwardly of the same as viewed in FIGS. 1 and 2. Guide pins 34 are provided along the path of the tape 27 to guide the tape as it moves from one reel to the other past the head assembly 33.

The rim drive is provided by concentric drive discs 36 and 38 which are mounted for coaxial and simultaneous rotation about a shaft 40. The drive disc 38 is engageable with the rim 24 while the drive disc 36 is engageable with the rim 18. Only one of the drive discs engages one of the rims at one time. A shaft 42 of a motor (not shown) mounted below the deck wall 12 always abuts against the drive disc 36 and frictionally engages the same to cause the discs 36 and 38 to rotate in one or the other direction. Means are provided (not shown) for shifting the shaft 40 and causing the drive disc 38 to engage the rim 24 during recording of the tape while causing the drive disc 36 to engage the rim 18 during rapid rewind of tape from the take-up reel 20 onto the supply reel 14. For a complete description of the operation of a rim drive tape recording and playback arrangement as shown in FIGS. 1 and 2, reference is had to a copending application entitled: "Simplified Tape Drive", Ser. No. 415,953. This application provides the details of construction and operation of the tape drive mechanism shown in FIGS. 1 and 2. However, as mentioned above, the rim drive tape mechanism is only illustrative and any other form of reel to reel apparatus may also be utilized in conjunction with the present invention.

Figure 4:
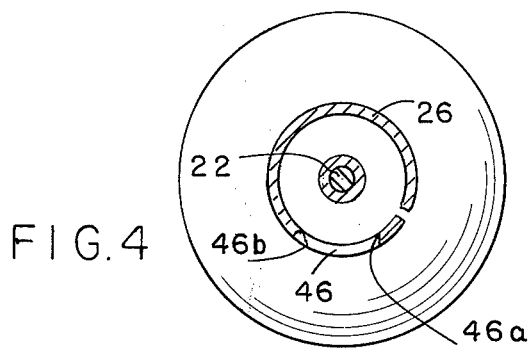
FIG. 4 is a cross-sectional view of a take-up reel in accordance with the present invention, taken along line 4—4 in FIG. 5, showing the slit in the central cylindrical portion adapted to receive the feeler shown in FIG. 1.
Figure 5:
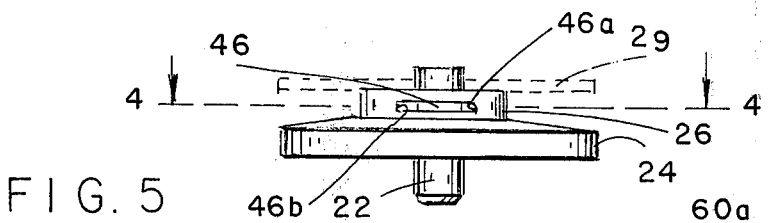
FIG. 5 is a front elevational view of the take-up reel shown in FIG. 4, further showing in outline the position of a cover plate which defines the tape receiving space.
Figure 6:
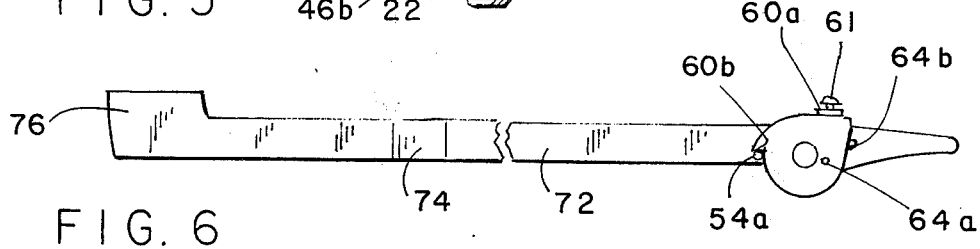
FIG. 6 is a top plan view of the message received and footage indicator in accordance with the present invention, shown mounted in FIGS. 1 and 2.

The message received and footage indicator in accordance with the present invention is generally designated in the FIGURES by the reference numeral 44. To use the indicator of the present invention, the tape drive described in the above referenced patent application is modified by providing a slit 46 in the central cylindrical portion 26 of the take-up reel 20. When another tape drive arrangement is utilized, a slit 46 in a central cylindrical portion 26 of a take-up reel must nevertheless be provided. This slit is shown in FIGS. 4 and 5 and is provided in addition to the gap conventionally provided for the passage of the ends of the tape interiorly of the central cylindrical portions 26 to secure the ends thereof. The precise dimensions or configuration of the slit 46 is not critical. However, the slit 46 is circumferentially disposed in the central cylindrical portion 26 in a plane substantially normal to the axis about which the take-up reel 20 rotates. The slit has two ends 46a and 46b whose functions will be described hereafter.

Figure 7:
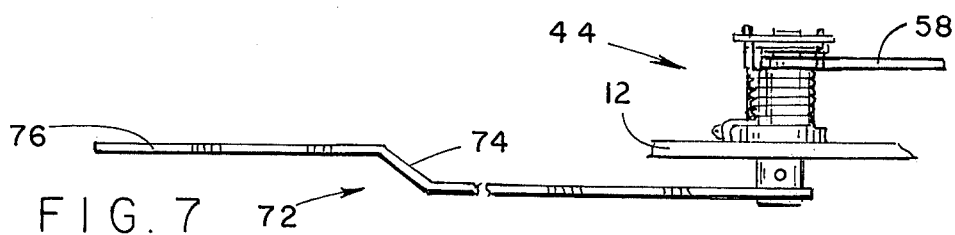
FIG. 7 is a front elevational view of the indicator shown in FIG. 6, showing the manner in which the indicator is mounted on the tape deck wall.
Figure 8:
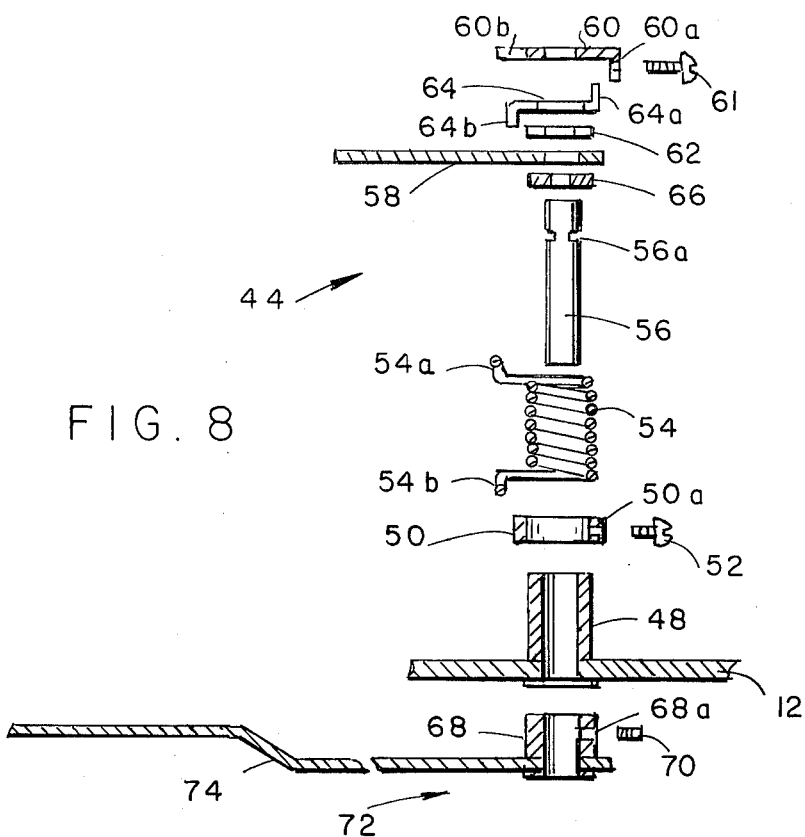
FIG. 8 is an enlarged cross sectional view of the indicator shown in FIG. 7, showing the elements comprising the indicator assembly and the manner in which the same is assembled.
Figure 9:
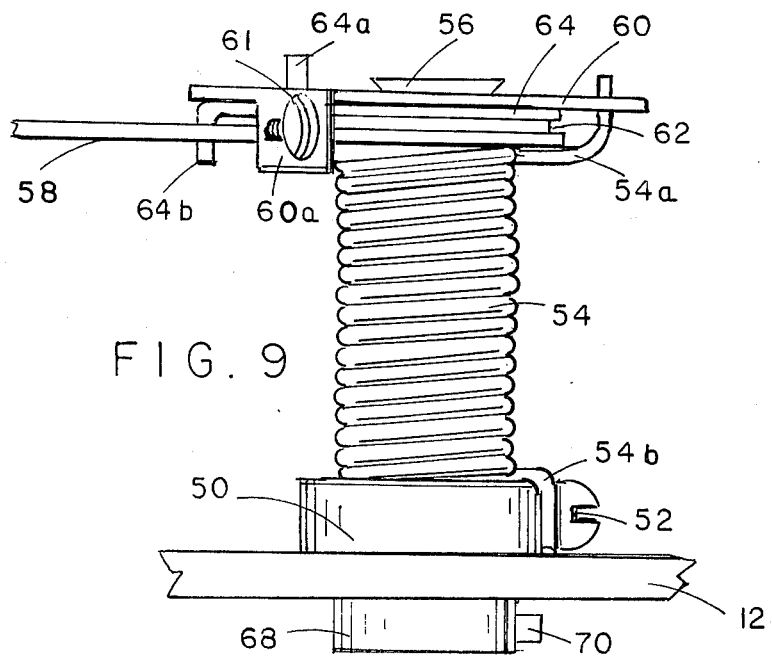
FIG. 9 is an enlarged rear elevational view of the message received and footage indicator, with the exception of the pointer, and showing the details of the assembled device and the manner in which the various parts cooperate with one another.

The construction details of the message received and footage indicator will now be described with reference to FIGS. 6–9. As can best be seen in FIG. 8, a pivot sleeve 48 is fixedly mounted on the deck or chassis wall 12. An adjustable collar 52 is slidably moved over the pivot sleeve 48 and lowered proximate to the wall 12, as shown in FIGS. 7 and 9. The adjustable collar 50 is provided with a threaded hole 50a through which an adjusting screw 52 is threadedly mounted. The adjustment collar 50 is disposed about the pivot sleeve 48 in coaxial relation with the latter, the collar being adapted to be fixed in a selected angular position about the pivot sleeve. The collar 50 can be fixed in position relative to the pivot sleeve 48 and the wall 12 by means of the adjustment screw 52. The adjustment screw further serves as engaging means which extends beyond the collar to form a spring engaging projection, as will be described hereafter.

Biasing means in the form of a helical torque spring 54 is provided which is disposed exteriorly and coaxially on the pivot sleeve 48. The helical spring 54 has an end 54b which is downwardly bent to engage the adjusting screw 52 which projects beyond the collar 50. Since the collar 50 is fixed relative to the wall 12, it should be clear that the end 54b of the spring 54 similarly becomes fixed relative to the wall 12. While the collar 50 provides means of adjusting the fixed angular position of the spring end 54b about the pivot sleeve 48, it should be clear that if this adjustable feature is not necessary, the spring end 54 can be fixed to the deck chassis wall in any conventional manner.

A shaft 56 extends axially and centrally through the helical spring 54, the collar 50 and the pivot sleeve 48. The shaft 56 is provided with an annular recess or slot 56a. Mounted on the shaft 56, between the annular slot 56a and the top end of the shaft 56, as viewed in FIGS. 8 and 9, is a feeler or finger 58 and a cam actuator 60. Disposed between the finger 58 and the cam actuator 60 is a washer 62 and a sprial spring 64 having an upwardly turned end 64a and a downwardly turned end 64b. An aperture is provided in the cam actuator 60 for receiving the spiral spring end 64a while a corresponding aperture is provided in the finger 58 for receiving the spiral end 64b. The spiral spring 64 causes a relative angular rotation of the cam actuator 60 relative to the finger 58, to the extent that this is permitted, as to be described hereafter.

The cam actuator 60 is provided with a tab in the form of a stop 60a and with a catch or edge 60b suitable to engage the end 54a of the helical spring 54. To prevent downward axial movement of the finger 58 and cam actuator 60, a C-ring or clip 66 is mounted on the shaft 56 within the annular slot 56a while any conventional means is provided for rigidly and fixedly connecting the cam actuator 60 to the top of the shaft 56. Therefore, while the finger 58 can rotate about the shaft 56 relative to the latter, the cam actuator 60 is fixed to the shaft and shares common pivotal or rotary movements therewith.

The lower end of the shaft 56 extends through the wall 12. A hub 68 is mounted on the lower end of the shaft and the hub is provided with a threaded opening 68a through which a set screw 70 is receivable. The set screw fixes the hub 68 on the shaft 56 and axially locks the latter to prevent relative axial movement of the shaft 56 within the pivot sleeve 48.

A pointer 72 is fixedly mounted on the hub 68, the pointer extending below and generally parallel to the plane of the wall 12. Once the hub 68 is fixed to the shaft 56, the pointer 72 shares common rotary movements of the shaft and of the cam actuator 60. However, the initial relative angular orientation of a pointer 72 relative to the shaft 56 can be selectively adjusted by the set screw 70.

The pointer 72 is generally elongate and is shown provided with a bend 74 intermediate the two ends thereof and a flag 76 at the free end thereof. The particular construction of the pointer 72 as described is for the purpose of permitting the flag 76 at the free end of the pointer to extend through a slot 78 in the chassis or enclosure of the tape deck 10 to thereby provide a visual indication of the angular displacement of the shaft 56. Associated with the slots 78 is a scale 80 which serves as a footage indicator to provide an indication of the extent to which recorded tape has been wound onto the take-up reel 20. By selecting a relatively long length for the pointer 72, small angular movements of the shaft 56 are magnified and visible movements of the flag 76 are possible.

Referring to FIGS. 1 and 9, the spiral spring 64 is arranged to rotate the feeler or finger 58 against the cam actuator stop in the form of the adjustment screw 61 mounted on the tab 60a. Adjustment of the screw 61 thereby angularly moves the finger 58 about the shaft 56 relative to the pointer assembly which includes the cam actuator 60, the shaft 56, the hub 68 and the pointer 72. The relative movements of the finger 58 which are possible by adjustment of the screw 61 are suggested by the dashed outline 58a. Thus, when the adjustment screw 61 is advanced in the tab 60a towards the finger 58, the latter rotates or turns about the shaft towards the dashed position 58a. The purpose for making this adjustment will be described hereafter in connection with the operation of the present invention.

As described above, the end 54a of the helical spring 54 is engaged with the edge or catch 60b forming part of the cam actuator 60. On the other hand, the end 54b is fixed in position by engagement with the adjustment screw 52. The helical coil 54 is arranged to move the pointer assembly in a clockwise direction, as viewed in the top views of FIGS. 1 and 2 about the pivot sleeve 48. Thus, the helical spring 54 causes the pointer assembly or indicator assembly, comprising the cam actuator 60, the shaft 56, the hub 68 and the pointer 72 to move to the positions shown in FIG. 1. Such clockwise angular movement is urged by the helical spring to a position where further continued movement is prevented by suitable stop means. In the present embodiment shown in the FIGURES, the stop means comprises the end of the slot 78. Thus, when the free end of the pointer 72 engages the end of the slot 78 as shown in FIG. 1, continued angular movement of the indicator assembly in the clockwise direction is prevented. However, it should be clear, that any other suitable stop means may be utilized to stop continued movement of the indicator assembly prior to or beyond the position shown in FIG. 1. The operation of the present invention, to be described, depends on the interrelationship between the finger 58 with the take-up reel 20. It should be clear, however, that removal of the take-up reel 20 would result in the pointer 72 moving to the angular position about the shaft 56 shown in FIG. 1, due to the action of the helical torque spring 54.

The operation of the message received and footage indicator will now be described. Firstly, it should be pointed out that the feeler or finger 58 is selected to have a length which is sufficient to at least partially extend through the slit 46 when mounted as shown in FIGS. 1 and 2 and engage each end 46a and 46b when moving out of the slit with respective continuous rotation of the take-up reel 20.

The first condition which will be described will be that wherein there is insufficient tape wound about the central cylindrical portion 26 of the take-up reel 20 to cover the slit 46. As suggested above, the feeler or finger 58 is mounted for pivotal movement in the plane of the slit 46. Accordingly, when the slit 46 is generally disposed in a direction facing the shaft 56, the finger 58 is permitted to enter the slit and at this time there are no forces applied by the take-up reel 20 or tape wound thereon upon the finger 58. Because no forces are applied to the finger 58 at this time, the position of the latter is determined by the helical spring 54 and the spiral spring 64. The finger 58 accordingly assumes the position generally shown in FIG. 1. As described above, under such a condition, when no external forces are applied to the finger 58, the spiral spring 64 causes the finger 58 to rotate against the stop or screw 61 while the entire indicator assembly, including the pointer 72, is caused to rotate in a clockwise direction by the helical spring 54 to a point where the free end of the pointer engages the end of the slot 78.

When the take-up reel rewinds to thereby transfer tape onto the supply reel 14, the slit 46 rotates in a counterclockwise direction, as viewed in FIG. 1. When the end 46b of the slit 46 engages the finger 58, the finger 58 is carried by the end 46b against the action of the spiral spring 64 to a position generally indicated by the reference numeral 58a. This movement, however, is not shared by the pointer assembly, including the cam actuator 60, since the latter is fixed against further clockwise rotation about the shaft, as viewed in FIG. 1, by the abutting relationship between the free end of the pointer 72 and the end of the slot 78. The provision of the spiral spring 64 and this added freedom of movement of the finger 58 represents a release mechanism which prevents damage to the indicator assembly when the take-up reel 20, for example, shoots beyond its fully unwound position.

The pointer 72 remains in the initial position shown in FIG. 1 irrespective of whether the finger extends through the slit 46 or is rotated relative to the pointer assembly and the cam actuator 60 to the position 58a as just described. In either of the two positions of the finger 58 shown in FIG. 1, the take-up reel 20 is unwound for all practical purposes and this represents a condition wherein no messages have been received.

When a message is received, and tape 27 is transferred from the supply reel 14 onto the take-up reel 20, this tape being accumulated in the central cylindrical portion 26. The accumulation of recorded tape onto the take-up reel represents a clockwise rotation of the take-up reel, as viewed in FIG. 1. When the finger 58 is disposed in a position 58a, clockwise rotation of the take-up reel causes the finger to enter within the slit 46 under the action of the spiral spring 64, which tends to bring the finger into abutment against the stop screw 61. Once the finger 58 is within the slit 46, as shown in FIG. 1, continued clockwise rotation brings the end 46a of the slit 46 into contact with the finger 58. When the slit 46 has progressed beyond the influence of the end of the finger 58, the latter is drawn or retracted from the slit and disposed upon the circumferential surface of the central cylindrical portion 26, this new position being suggested by the position shown in FIG. 2. The movement of the finger 58 exteriorly of the slit 46 in this manner causes an abrupt counter-clockwise angular movement of the finger about the shaft 56. Because the finger 58 abuts against the screw 61 during counter-clockwise movements of the finger 58, the latter carries the cam actuator 60, together with the other elements comprising the indicator assembly, against the action of the helical spring 54.

The initial abrupt movement of the finger 58 from a position extending through the slit 46 to a position abutting the circumferential surface of the central cylindrcial portion 26 represents an abrupt displacement of the finger 58, this displacement being transmitted to the indicator assembly including the pointer or lever 72 to bring the latter from the initial position shown in FIG. 1 to a discreet position which is represented on the scale 80 by the numeral 0. The abrupt movement of the pointer 72 in this manner represents a beginning of accumulation of tape onto the take-up reel 20 at a time when there is approximately zero footage of tape on that reel. Thus, while the position of the flag 76 shown in FIG. 1 represents no messages received, movement of the flag to the 0 position of the scale 80 indicates that a message has been received and that footage has commenced to accumulate on the take-up reel 20.

An important feature of the present invention is that once the finger 58 moves out from its slit 46 due to commencement of tape accumulation on the take-up reel 20, the finger 58 is not permitted to reenter the slit 46 upon successive rotations of the take-up reel due to the fact that this slit is covered by at least one layer of tape after initial accumulation has commenced.

It should be clear from the above description, and an examination of the device as shown in FIG. 2, that the pointer 72 now gradually and continuously moves in a direction beyond the second position represented by the 0 marking on a scale 80 against the action of the helical spring 54 when additional tape is wound on the take-up reel 20 and the finger 58 is displaced by the increased accumulation of tape about the central cylindrical portion 26. The position to which the indicator moves beyond the discreet position 0 on the scale provides an indication of the extent to which recorded tape has been wound onto the take-up reel. This information can be utilized as in prior art devices provided with resetable counters.

As above described, when the finger 58 is initially moved out from the slit 46 upon the reception of the message, the finger 58 abuts against the circumferential surface of the central cylindrical portion 26 to move the flag to the region of the 0 marking on the scale 80. The adjustment screw 61 is provided to permit the adjustment of the normal angular orientation between the cam actuator 60 and the finger 58 to thereby precisely position the pointer 72 at the 0 footage marking on the scale 80 at the exact moment that the finger 58 moves out of the slit 46.

As described above, the adjust collar 50 can be selectively angularly positioned about the pivot sleeve 48 and fixed in the selected position by means of the adjusting screw 52. However, since the end 54b is engaged with the adjusting screw 52, this provides a means of adjusting the torque or biassing forces exerted upon the cam actuator 60 at the latch or edge 60b. The biassing forces exerted by the helical spring 54 cause the pointer assembly to turn in a clockwise direction about the shaft 56 as viewed in FIG. 1. These biassing forces are transmitted to the finger 58 by means of the stop screw 61. Accordingly, the collar 50 is adjusted to cause the finger 58 to enter into the slit 46 and cause the pointer to move to the initial position shown in FIG. 1 when the tape is rewound from the take-up reel 20 to the supply reel 14. However, this force must not be made excessive since this force is also applied to the tape 27 once the latter is wound about the central cylindrical portion 26. Excessive force can damage the tape by concentrating the biassing force of the spring 54 at the tip of the finger 58 which abuts against the tape.

The message received and footage indicator 44 above described thus represents a construction which is simple and economical to manufacture. The single device which is mounted about the shaft 56 constitutes both a message received and a footage indicator. To facilitate observation of whether a message has been received, the flag 76 can be covered by any suitable means when in the position shown in FIG. 1. When the pointer 72 moves to the 0 position on the footage scale, the flag 76 may then be uncovered to bring the same into plane view of the observer. Further, the scale 80 is merely illustrative and any other suitable scale may be utilized which cooperates with the pointer 72. Thus, it is possible to provide a transparent surface which is disposed substantially above the flag 76 along the slot 78. The markings on such a transparent surface would then constitute the scale which may thus be more readily visible.

It should be clear from the above description, that when the tape 27 is rewound into the supply reel 14, the helical spring 54 urges the pointer assembly to continuously rotate in a clockwise direction, as viewed in FIG. 1, until the pointer reaches the 0 marking on the scale or at the position just prior to the entry of the finger 58 within the slit 46. When the slit moves to the position shown in FIG. 1, during continued rewinding of the tape, the helical spring 54 causes the finger 58 to enter the slit 46 and causes the pointer 72 to return to the initial position shown in FIG. 1. Thus, the message received and footage indicator is self resetting and requires no additional steps as is necessary with some prior art footage indicator devices. Once the tape is fully rewound, the flag 76 is again in a "no message received" position and the device is ready for renewed message reception.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. In tape drive apparatus, a message received and footage indicator comprising a take-up reel for receiving and accumulating tape with recorded messages thereon, said take-up reel having a central cylindrical portion about which the tape is wound which is provided with a circumferential slit disposed in a plane substantially normal to said axis about which said take-up reel rotates; feeler means mounted proximate to said take-up reel and mounted for pivotal movement in the plane of said slit; indicator means coupled to said feeler means; and biasing means for moving said indicator means to a first position when said slit is exposed and said feeler means enters the same, said indicator means moving to a discreet second position against the action of said biasing means when said slit is covered by at least one layer of tape and said feeler means is prevented from entering into said slit, said second position signifying that at least one message has been received and said take-up reel has moved from a totally unwound condition to at least a partially wound condition, said indicator means gradually and continuously moving in a direction beyond said second position against the action of said biasing means when additional tape is wound on said take-up reel and said feeler means is displaced by the increased accumulation of tape about said central cylindrical portion, the position to which said indicator moves beyond said second position providing an indication of the extent to which recorded tape has been wound onto said take-up reel; said indicator means including a cam actuator having an adjustable stop engageable with said feeler means, said adjustable stop fixing the angular position of said indicator means at a predetermined angular position relative to said feeler means, whereby the precise initial position of said indicator means may be selected from which tape footage can be measured.

2. A message received and footage indicator as defined in claim 1, wherein said feeler means comprises an elongate finger the length of which is sufficient to at least partially extend through said slit and engage each end thereof when moving out of said slit with respective continuous rotation of said take-up reel.

3. A message received and footage indicator as defined in claim 1, wherein said indicator means comprises a pointer mounted for concentric pivotal movement with said feeler means.

4. A message received and footage indicator as defined in claim 1, further including adjustment means for adjusting the normal angular orientation between said indicator and feeler means when the latter engages said central cylindrical portion subsequent to moving out of said slit during initial winding of tape on said take-up reel, whereby said adjustment means regulates the location of said second position of said indicator means.

5. In tape drive apparatus, a message received and footage indicator comprising a take-up reel for receiving and accumulating tape with recorded messages thereon, said take-up reel having a central cylindrical portion about which the tape is wound which is provided with a circumferential slit disposed in a plane substantially normal to the axis about which said take-up reel rotates; feeler means mounted proximate to said take-up reel and mounted for pivotal movement in the plane of said slit; indicator means coupled to said feeler means; and biasing means for moving said indicator means to a first position when said slit is exposed and said feeler means enters the same, said indicator means moving to a discreet second position against the action of said biasing means when said slit is covered by at least one layer of tape and said feeler means is prevented from entering into said slit, said second position signifying that at least one message has been received and said take-up reel has moved from a totally unwound condition to at least a partially wound condition, said indicator means gradually and continuously moving in a direction beyond said second position against the action of said biasing means when additional tape is wound on said take-up reel and said feeler means is displaced by the increased accumulation of tape about said central cylindrical portion, the position to which said indicator moves beyond said second position providing an indication of the extent to which recorded tape has been wound onto said take-up reel; said indicator means including shaft means substantially parallel to the axis about which said take-up reel rotates, a pointer fixed on said shaft means, and a cam actuator fixed to said shaft means; said feeler means being pivotally mounted on said shaft means for movement relative to the latter and engageable by said cam actuator, said biasing means acting on said cam actuator to urge said feeler means into abutment against said central cylindrical portion and the tape wound about the latter, whereby movement of said feeler means exteriorly of said slit and abutment against an accumulated quantity of tape on said take-up reel causes said cam actuator and said pointed to move against the action of said biasing means.

6. A message received and footage indicator as defined in claim 5, wherein said cam actuator includes a stop; and further biasing means acting between said cam actuator and said feeler means to urge the latter into abutment against said stop, whereby said feeler means follows the angular movements of said cam actuator within the permitted range of angular movements of said indicator means.

7. A message received and footage indicator as defined in claim 6, wherein said cam actuator and said feeler means are disposed adjacently and in opposition to each other and are each provided with an aperture, said further biasing means comprising a spiral spring the ends of which each respectively engage another of said apertures.

8. A message received and footage indicator as defined in claim 5, wherein said biasing means comprises a helical spring concentrically mounted on said shaft means, one end of said helical spring being engaged with said cam actuator with the other end of said helical spring being fixed in position.

9. A message received and footage indicator as defined in claim 8, said indicator means further comprising a pivot sleeve fixed in a deck wall of the tape drive apparatus, said shaft means extending through said pivot sleeve and said helical spring being disposed exteriorly and coaxially with the latter, said other end of said helical spring being fixed to the deck wall.

10. A message received and footage indicator as defined in claim 9, further comprising adjustment means for adjusting the relative angular position to which said other end of said helical spring is fixed, whereby the biasing forces exerted by said biasing means against said cam actuator can be adjusted, this regulating the pressure which said feeler means applies against said central cylindrical portion and tape wound around the latter.

11. A message received and footage indicator as defined in claim 10, wherein said adjustment means comprises a collar disposed about said pivot sleeve in coaxial relation with the latter, said collar being adapted to be fixed in a selected angular position about said pivot sleeve and being provided with engaging means for engaging said other end of said helical spring.

12. A message received and footage indicator as defined in claim 11, wherein said engaging means comprises a set screw mounted in said collar movable into abutment against said pivot sleeve and extending beyond said collar to form a spring engaging projection.

* * * * *